United States Patent [19]

Lowenson et al.

[11] Patent Number: 4,833,466

[45] Date of Patent: May 23, 1989

[54] PULSE CODE MODULATION DECOMMUTATOR INTERFACING SYSTEM

[75] Inventors: Jeffrey Lowenson; Khosrow Hessamian, both of Chatsworth, Calif.

[73] Assignee: Hughes Aircraft Company, Los Angeles, Calif.

[21] Appl. No.: 38,557

[22] Filed: Apr. 15, 1987

[51] Int. Cl.$^4$ ............................................. H04Q 11/00
[52] U.S. Cl. ............................ 340/825.5; 340/825.06; 370/112
[58] Field of Search ............ 340/825.06, 825.1, 825.5, 340/870.13, 870.19, 870.22; 370/79, 82-84, 91, 99, 112; 375/8, 34, 99, 103, 104; 371/15; 364/200 MS File

[56] References Cited

U.S. PATENT DOCUMENTS

| | | | |
|---|---|---|---|
| 3,991,611 | 11/1976 | Marshall, III et al. | 364/422 |
| 4,137,562 | 1/1979 | Boeck et al. | 364/200 |
| 4,165,491 | 8/1979 | Geffon | 375/95 |
| 4,168,469 | 9/1979 | Parikh et al. | 370/83 |
| 4,202,035 | 5/1980 | Lane | 364/200 |
| 4,271,507 | 6/1981 | Gable et al. | 370/79 |
| 4,355,310 | 10/1982 | Belaigues et al. | 340/825.54 |
| 4,435,781 | 3/1984 | Stattle et al. | 364/900 |

Primary Examiner—John W. Caldwell, Sr.
Assistant Examiner—Edwin C. Holloway, III
Attorney, Agent, or Firm—R. A. Hays; M. W. Sales; A. W. Karambelas

[57] ABSTRACT

A pulse code modulation decommutator interface system includes a standard computer interface, a standard decommutator interface, control logic and memory. Control signals from the computer selectively control the data transfer from the memory to the computer. The memory can selectively be used to store information therein that is thus accessible by the computer to validate the decommutator data transferred to the computer.

6 Claims, 6 Drawing Sheets

PULSE CODE MODULATION DECOMMUTATOR INTERFACING SYSTEM

BACKGROUND OF THE INVENTION

1. Field of the Invention

The present invention relates to telemetry systems. More specifically, the present invention relates to pulse code modulation data transmission and decommutation systems.

While the invention is described herein with reference to an illustrative embodiment for a particular application, it is not limited thereto. Those of ordinary skill in the art, having access to the teachings provided herein, will recognize additional modifications, applications and embodiments within the scope of the present invention.

2. Description of the Related Art

In the development of sophisticated electromechanical systems, it is often necessary to transmit, receive, record and analyze data relating to the performance of the system in a laboratory or operational environment. Typically, this telemetry data is encoded prior to transmission, received, demodulated, and decoded for analysis. Pulse code modulation (PCM) encoding schemes are often used in this application.

In most PCM schemes, the received and demodulated data stream is synchronized to a local oscillator and input to a decommutator. The decommutator (DECOM) searches the synchronized data for a particular sync pattern. When the pattern is detected, the DECOM formats the data for input and analysis by computer. Unfortunately, the use of conventional DECOM units may be somewhat problematic.

First, the telemetry data from the DECOM unit must be transferred to the host computer via direct memory access (DMA). While this data is being written to a disk, new data must be accumulated in memory. This is also a DMA transfer, and it has been noted that two simultaneous DMA transfers make a typical minicomputer bus very busy. The level of additional activity in the host computer can lead to frequent system crashes. In the past, this problem was addressed by playing the recorded telemetry data back at half speed. However, this doubled the data acquisition time.

Secondly, some commercially available DECOMs provide interface cards which reside in the computer, as a substitute for the interface cards normally provided by the computer manufacturer. Often, these cards are found to violate the manufacturer's interfacing standards. This results in computer crashes, loss of data, and multiple test runs to acquire a single set of valid data. Noise generated within the DECOM, and transmitted over clock and control lines into the computer interface cards further contributes to the loss of data.

Thirdly, some commercially available DECOMs have minimal built-in-test 'BIT' and diagnostics capability, for the DECOM and for the DMA interface cards. This often results in significant system down time.

Thus there is a perceived need in the art for an interfacing, between a DECOM and a host computer, that permits direct memory access without impairment of the operation of the computer; has a built-in-test capability; uses standard or recommended interfacing protocols; and has minimal noise susceptibility or adequate noise rejection capability.

SUMMARY OF THE INVENTION

The need in the art for an improved DECOM interfacing scheme is addressed by the interfacing system of the present invention. The system of the present invention includes a standard computer interface, a standard decommutator interface, a memory and logic for controlling the provision of data from the DECOM to the computer. The invention thereby provides means for receiving and selectively storing a plurality of first control signals from the computer and for selectively providing the first control signals to the decommutator; second means for receiving and selectively storing a plurality of second control signals from the decommutator and for selectively providing the second control signals to the computer; and third means for receiving and storing data from the decommutator and for selectively providing the data to the computer in accordance with a protocol established by the first and second control signals. In a specific embodiment, the memory is a first-in first-out (FIFO) memory. By providing a memory in the data path, the invention allows PCM data collection to take place at full speed, in real time if desired, without causing computer crashes. In an extension of the invention, means are included for validating the data received from the decommutator. In a second extension of the invention, means are provided for rejecting noise in the signals received from the decommutator.

DESCRIPTION OF THE INVENTION

Figure 1:
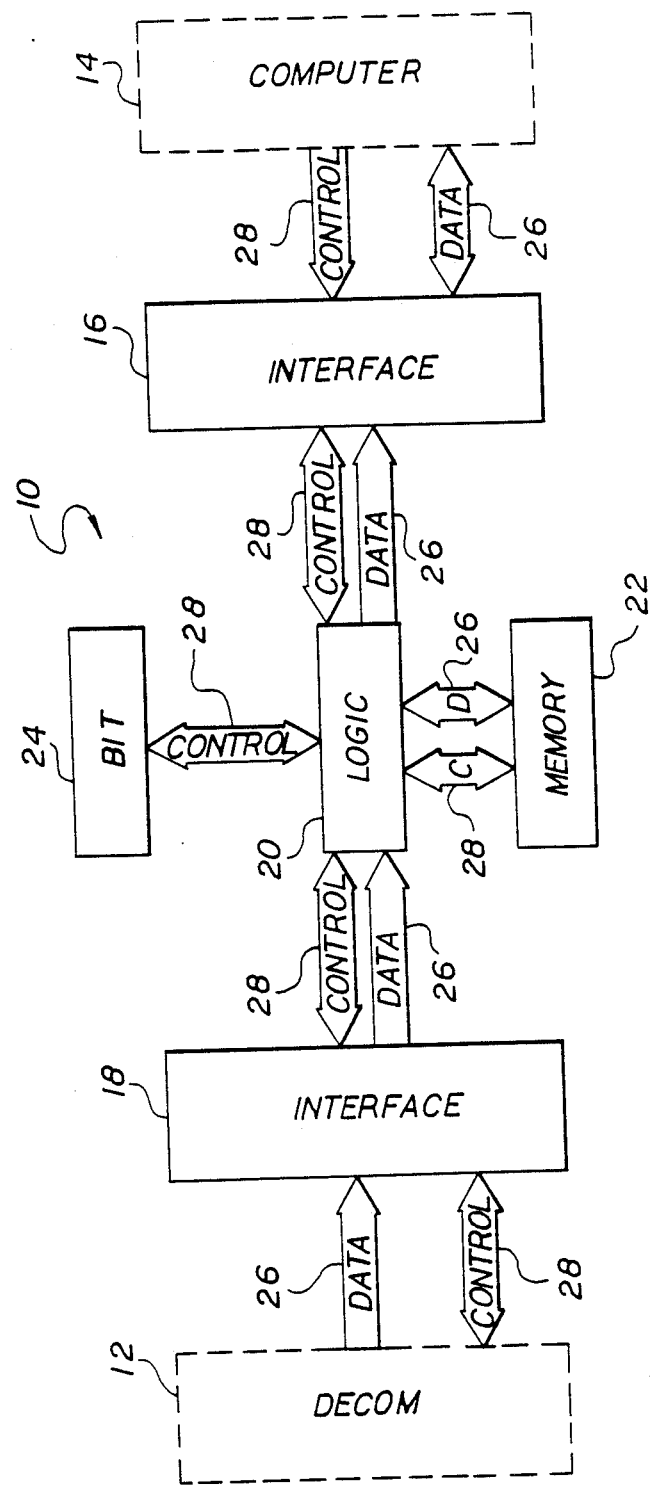
FIG. 1 is a simplified operational block diagram of the pulse code modulation decommutator interface system of the present invention in its intended operational environment.

FIG. 1 is a simplified operational block diagram of the pulse code modulation DECOM interface system 10 of the present invention. The interface system 10 is shown in its intended application between an off-the-shelf DECOM (shown in phantom) 12 and an off-the-shelf computer (also shown in phantom) 14. By way of example, DECOM 12 may be provided by DSI Corporation and the computer 14 may be a PDP 11 as manufactured by Digital Equipment Corporation. The DECOM 12 communicates with the computer 14 through the interface system 10 of the present invention. Specifically, the computer 14 communicates with the interface system 10 through a computer interface 16 and the interface system 10 communicates with the DECOM 12 through a DECOM interface 18. Between the two interfaces 16 and 18 is a logic circuit 20, a memory system 22, and a built-in-test circuit 24. Data is communicated from the DECOM 12 through the interface system 10 to the computer 14 via a data bus 26. A control bus 28 provides nondata signals for setting up the DECOM 12 and controlling the flow of data as discussed more fully below. It will be recognized by those skilled in the art that the data and control buses may be one and the same without departing from the scope of the invention. It should also be noted that the term 'control' is used loosely to facilitate the explanation of the invention. Those skilled in the art will recognize that the term may have a more limited definition and use than that of the present application.

As shown in FIG. 1, data from the DECOM 12 flows through the interface 18, into a first-in first-out (FIFO) memory system 22 under control of the logic circuit 20. The logic circuit 20 controls the flow of data from the memory system 22 through the interface 16 to the computer 14 under the command of the computer. As discussed more fully below, the memory, built-in-test feature and the standard interfaces are advantageous features of the present invention relative to the prior art.

Figure 2:
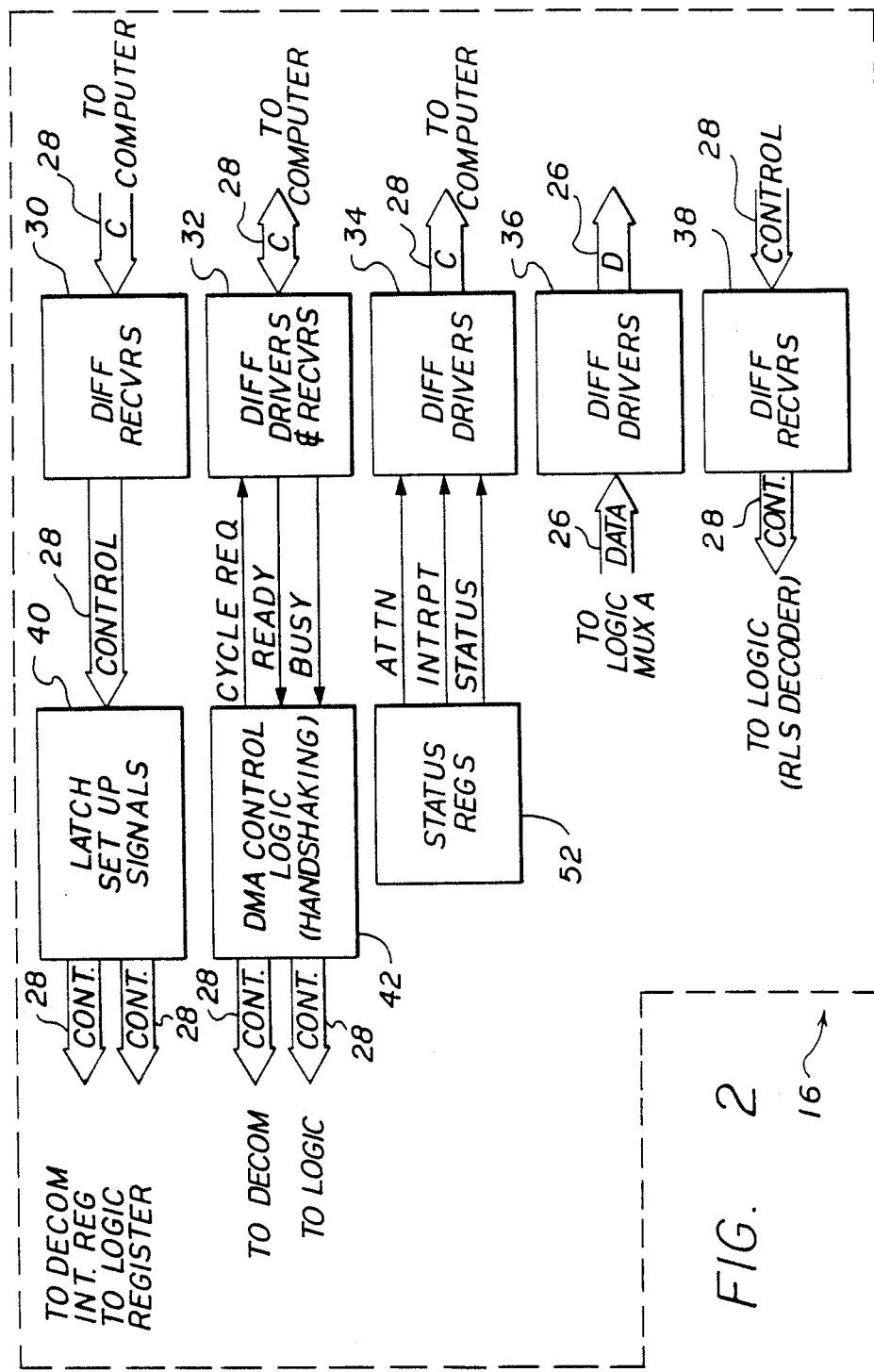
FIG. 2 is a diagramatic representation of the computer interface subsystem of the interface system of the present invention.
Figure 3:
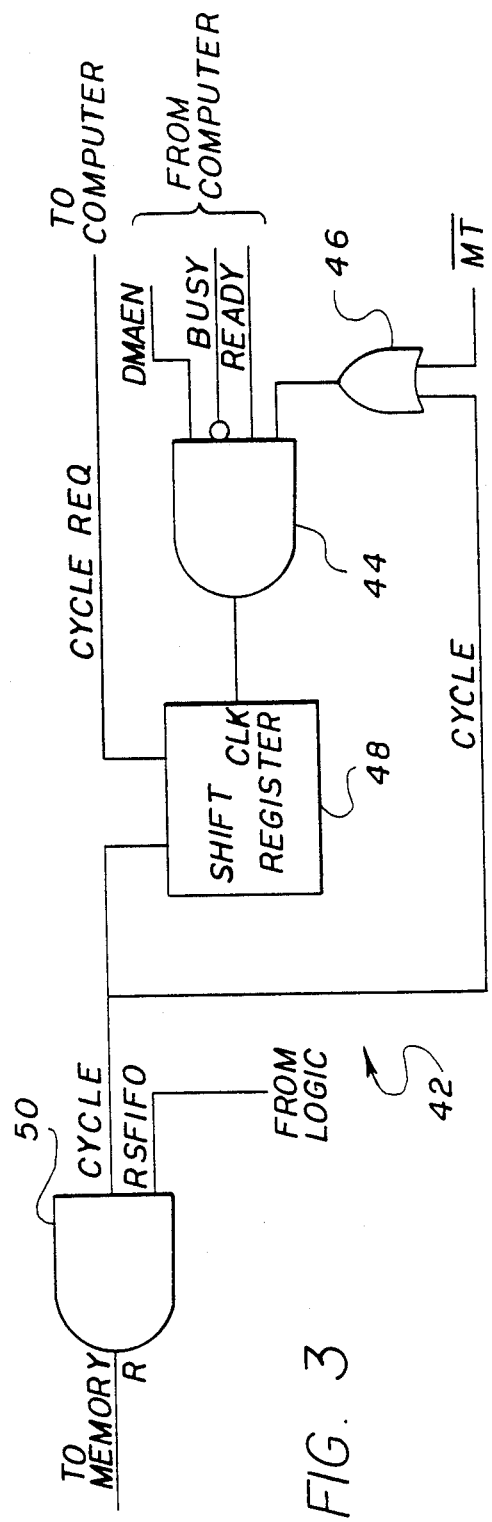
FIG. 3 is a simplified illustrative implementation of the cycle request logic of the computer interface subsystem of the present invention.

The interfaces 16 and 18 are designed to provide signals to and from the computer 14 and DECOM 12 respectively in the format and protocol recommended by the manufacturers. The computer interface 16 is shown in more detail in FIG. 2. The interface 16 includes a plurality of differential drivers and receivers 30 through 38 (even numbers only). The drivers and receivers provide complementary differential inputs to and outputs from the computer 14 respectively. The first receivers 30 provide control signals to a latch 40. The latch 40 in turn provides setup and control signals on the control bus 28 for the logic circuit 20 of the interface 10 and setup signals for the DECOM 12 Handshaking between the computer 14 and the DECOM 12 is provided by DMA control logic 42. As is typical, the computer provides 'busy' and 'ready' signals to the system 10 which in turn provides 'cycle request' signals to the computer. A simplified illustrative implementation of the DMA control logic 42 is shown in FIG. 3. The 'busy' and 'ready' signals from the computer 14 are ANDed at the AND gate 44 with the OR of a cycle signal and a 'memory not empty' signal. The final input to the AND gate 44 is an enable signal from the computer 14. One output of a shift register 48 provides the 'cycle request' signal for the computer 14 while a second output, or combination of outputs, provides the 'cycle' signal. The 'cycle' signal provides a 'read' strobe for the FIFO memory system 22.

Returning now to FIG. 2, a set of status registers 52 provide 'status', 'attention' and 'interrupt' signals to the computer 14 via a third set of drivers 34. Additional drivers and receivers 36 and 38 are provided. Drivers 36 provide for the flow of data to the computer from the FIFO memory system via the logic circuit 20 as discussed more fully below. The fifth set of receivers 38 provide control signals from the computer to an RLS decode subcircuit of the logic circuit 20 as also discussed more fully below. Thus, control signals flow to and from the computer 14 to the logic circuit 20 and data signal flow from the logic circuit 20 to the computer via the computer interface 16 in a format and protocol recommended by the computer manufacturer.

Figure 4:
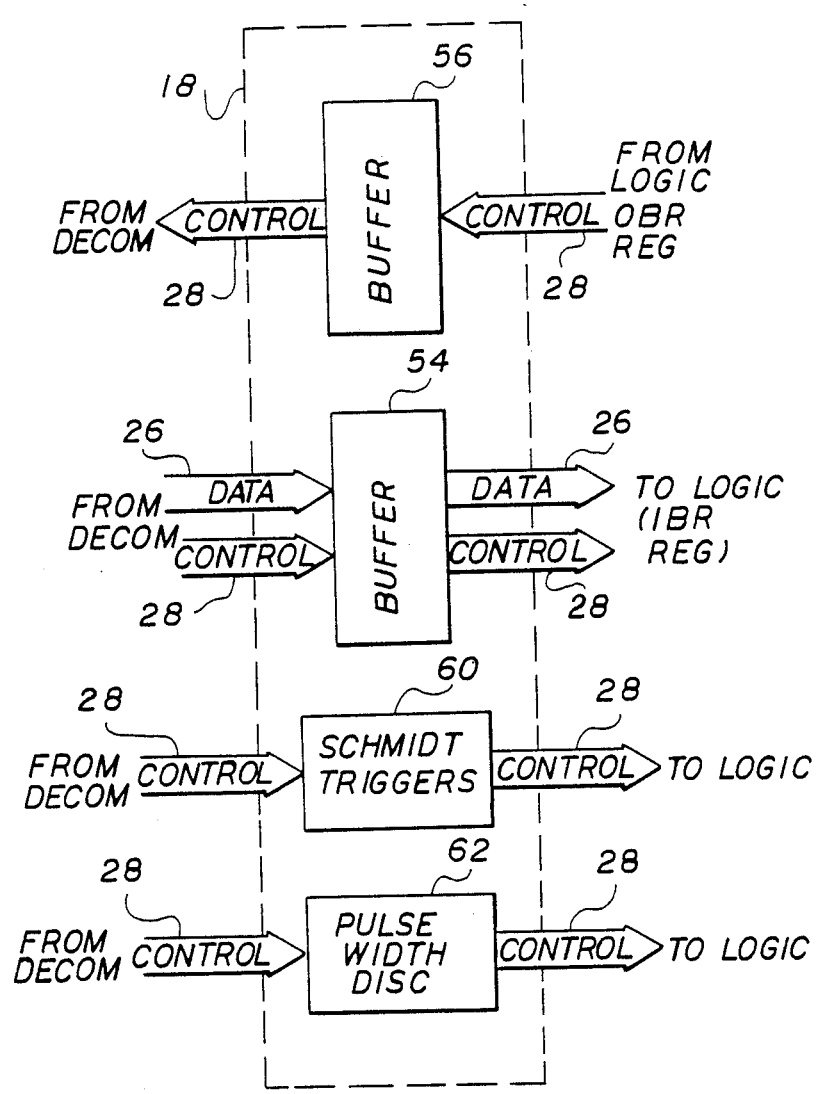
FIG. 4 is a diagramatic representation of the DECOM interface subsystem of the interface system of the present invention.

A simplified illustrative implementation of the DECOM interface 18 is shown in FIG. 4. Here, the differential drivers are not shown though they may be used as is known in the art. The DECOM interface includes a first buffer 56 by which the setup signals from the computer 14 via the latch 40 and OBR register in the logic circuit 20, are provided to the DECOM 12. A second buffer 54 buffers the data from the DECOM 12 to the logic circuit of the interface system 10. The control bus 28 is shown separately entering and exiting the second buffer 54 to illustrate that the buffer also provides control data on its output bus. Schmidt triggers 60 and pulse discriminators 62 provide noise rejection for the formatting and handshaking signals from the DECOM 12 to the computer 14.

Figure 5:
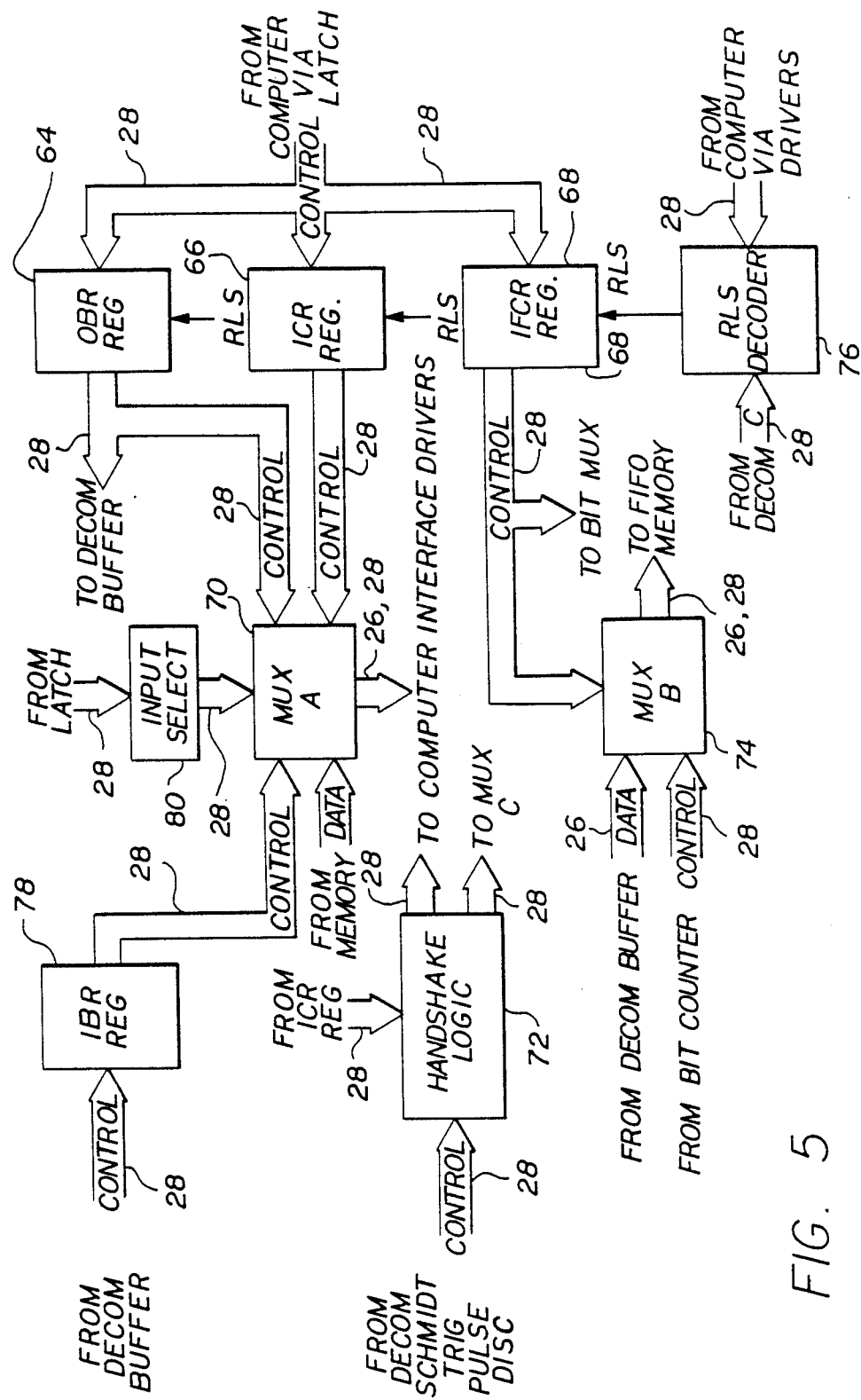
FIG. 5 is a diagramatic representation of the control logic of the interface system of the present invention.

As shown in FIG. 1, both interfaces 16 and 18 communicate control signals bi-directionally over the control bus 28. Data signals are communicated from the DECOM 12 through the DECOM interface 18 through a switching multiplexer in the logic circuit 20 into and out of the memory system 22 and through the computer interface 16 to the computer 14. The logic circuit 20 is shown in FIG. 5. It includes an OBR register 64, an ICR register 66 and an IFCR register 68. The OBR register 64 receives and stores DECOM setup signals from the computer 14 through the latch 40. These signals are provided to the DECOM buffer 54 via the bus 28 and set the word size, frame size, sync pattern and other parameters as is known in the art. The output of the OBR register 64 is also provided to a first multiplexer (MUX A) 70 for selective input to the computer 14. The ICR register 66 receives input from the computer 14 via the latch 40 and stores control signals for the operation of the interface system 10. For example, the signals stored in the ICR register 66 set flags and act as control signals for gating and handshaking logic 72 which allows for selective ignoring of bit sync or frame lock signals for example, or drives a multiplexer (not shown) which controls writes to the computer 14 as is known in the art. This provides for software control of the dat provided to the computer 14. The output of the ICR register 66 is also input to MUX A 70 to allow the computer 14 to check the contents thereof. The IFCR register 68 also receives input from the computer 14 via the latch 40 and provides interface control signals for the system 10. Signals stored in the IFCR register 68 control the operation of the BIT 24 (as discussed more fully below) and the operation of a second multiplexer (MUX B) 74. MUX B selects between the output of the BIT circuit 24 and the data from the DECOM buffer 56 for storage in the FIFO memory system 22. The OBR, ICR and IFCR registers are strobed by signals from a register load strobe (RLS) decoder 76. The RLS decoder 76 may simply include a latch and a demultiplexer to select a register and strobe the selected register under the control of the computer 14.

Additional inputs are provided to MUX A 70 by data from the FIFO memory 22 and setup control signals from the DECOM 12 via an IBR register 78. Input select logic operating under signals from computer 14 via the latch 40 provides control of the MUX A 70 o selectively provide the various inputs to the computer.

Figure 6:
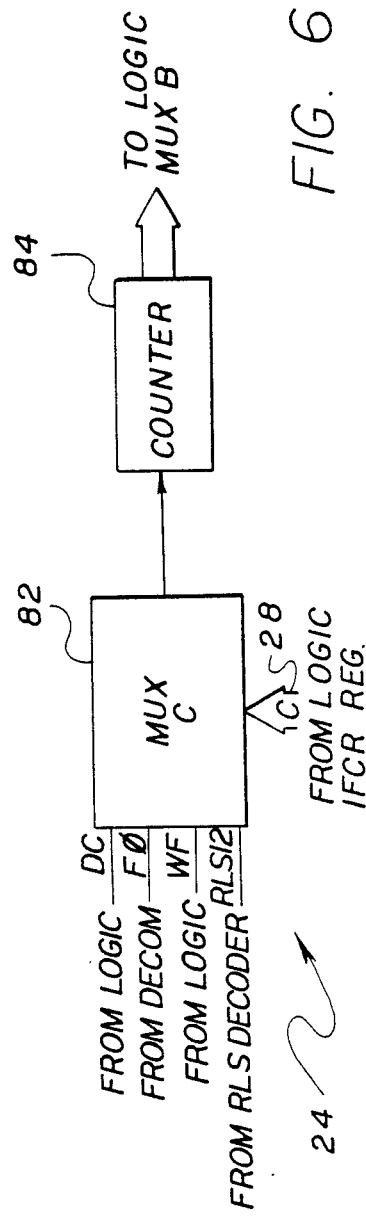
FIG. 6 is a simplified illustrative implementation of the built-in-test subsystem of the interface system of the present invention.

FIG. 6 shows a simplified illustrative implementation of the built-in-test (BIT) circuit 24. A third multiplexer MUX C 82 operates under control of signals provided by the IFCR register 68 to select one of several inputs to the mux for a clock input to a counter 84. In the illustrative embodiment, the inputs to MUX C are (1) the dropout count signals; (2) the frame 0 signals; (3) the write flag; and (4) a memory reset pulse from the RLS decoder 76 (all of these signals being provided by the logic circuit 20). It will be appreciated by those skilled in the art that other inputs may be selected for input to the counter 84. The counter 84 counts pulses on the selected line and provides the count as an input to MUX B of the logic circuit 20, see FIG. 5. When selected by MUX B, the count is temporarily stored in the FIFO memory system 22 prior to input to the computer 14. The BIT information may thus provide test data relating the data provide by the DECOM. For example, by counting the DECOM clock pulses, the BIT 24 may provide an indication of the number of words transmitted by the DECOM 12. By selecting MUX B input from counter 84, consecutive numbers are sent to the computer 14, instead of DECOM data. This feature is useful for diagnostics. This then may be used by the computer to verify that all data within a frame has been received. By selecting the inputs to MUX C 82, the designer may provide a count of any of a number of clocks that are customarily used in the illustrative application to the computer.

Figure 7:
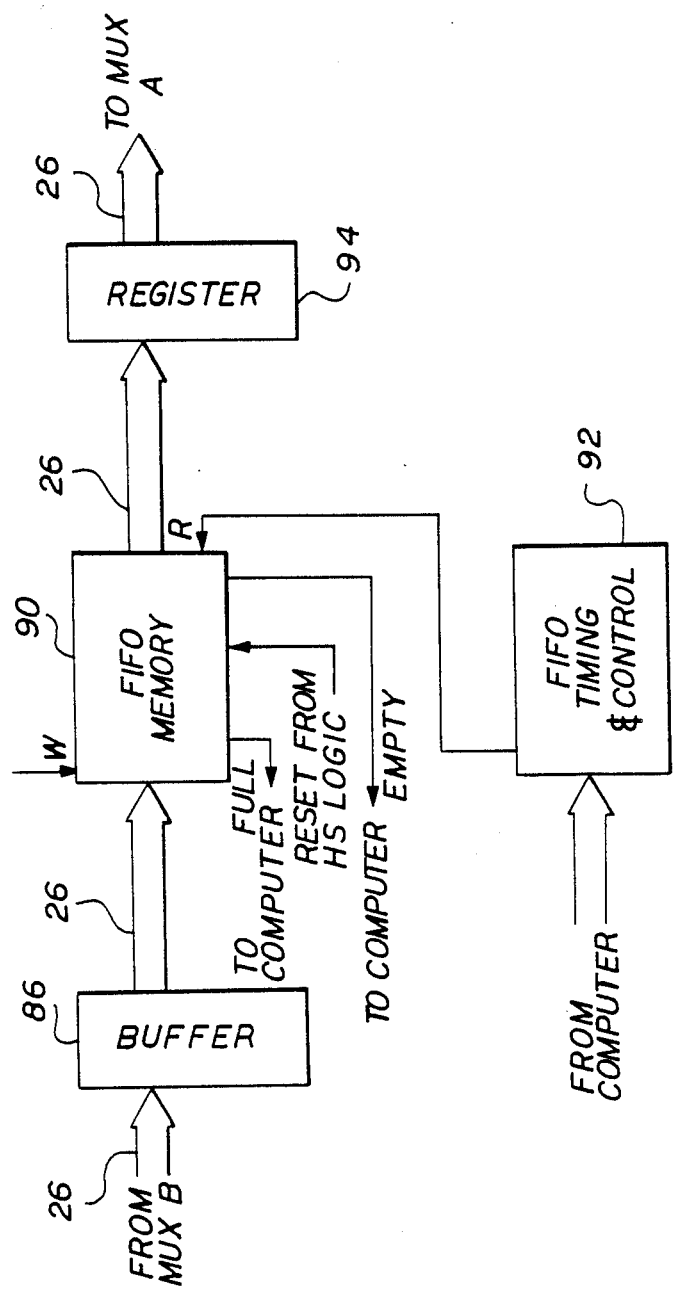
FIG. 7 is a simplified illustrative implementation of the first-in first-out memory system of the interface system of the present invention.

FIG. 7 shows a simplified illustrative implementation of the FIFO memory system 22. It includes a buffer 86 which operates on the DECOM data and BIT data provided by MUX B 74 of the logic circuit 20. The buffered data is written into a FIFO memory 90 under control of write pulses provided by the DECOM 12. The memory 90 provides 'full' and 'empty' signals to the computer 12 and receives a reset pulses from handshaking logic 72. Read pulses are provided to the memory 90 by a timing and control circuit 92 which is in turn controlled by the computer 14. The FIFO timing and control circuit 92 may be implemented with a shift register and Exclusive OR gates as in known in the art. As data is read from the memory 90 it is stored in a FIFO register 94. The output of the FIFO register 94 is input to the computer 14 via the MUX A 70 of the logic circuit 20.

Thus, the present invention has been described herein with reference to an illustrative embodiment for a particular application. As mentioned above, those of ordinary skill in the art and access to the teaching provided herein will recognize additional modifications, applications and embodiments within the scope of the present invention. For example, the invention is not limited to use with a DECOM or computer of a particular manufacture. The invention may be useful in other applications necessitating an interface between a source of data and a computer or data storage means. Nor is the invention limited to any particular handshaking or formatting protocol, nor to any logic circuitry by which it is implemented.

It is therefore intended by the appended claims to cover any and all such applications, modifications and embodiments. Accordingly,

What is claimed is:

1. A pulse code modulation decommutator interfacing system for interfacing a decommutator to a copter comprising:
   means for receiving and selectively storing a plurality of first control signals from said computer and for selectively providing said first control signals to said decommutator;
   means for receiving and selectively storing a plurality of second control signals from said decommutator and for selectively providing said second control signals to said computer;
   means for receiving and storing data from said decommutator;
   means for retaining data relating to said data from said decommutator, which retained data being accessible by said computer for validating said data received by said computer from said decommutator; and
   logic means for selectively providing said data to said computer in accordance with said first control signals, said logic means further including means for selecting between said data and said retained data for storage in said means for receiving and storing data.

2. The interfacing system of claim 1 wherein said third means includes a first in first out memory.

3. The interfacing system of claim 2 wherein said third means further includes memory timing and control means for selectively providing the contents of said memory to said computer in accordance with said first and second control signals.

4. The interfacing system of claim 3 wherein said logic means includes means responsive to said first control signals to select a register in which second control signals from said decommutator are stored.

5. The interfacing system of claim 1 wherein said second means includes means for rejecting noise in the signals received from said decommutator.

6. The interfacing system of claim 5 wherein said noise rejecting means includes means for discriminating the width of pulses in said signals.

* * * * *